US010859372B2

(12) United States Patent
Dou

(10) Patent No.: US 10,859,372 B2
(45) Date of Patent: Dec. 8, 2020

(54) COMPREHENSIVE INFORMATION DETECTION SYSTEM FOR STEEL WIRE ROPE

(71) Applicant: LUO YANG WIRE ROPE INSPECTION TECHNOLOGY CO., LTD., Henan (CN)

(72) Inventor: Bolin Dou, Beijing (CN)

(73) Assignee: LUO YANG WIRE ROPE INSPECTION TECHNOLOGY CO., LTD., Henan (CN)

( * ) Notice: Subject to any disclaimer, the term of this patent is extended or adjusted under 35 U.S.C. 154(b) by 71 days.

(21) Appl. No.: 16/079,458

(22) PCT Filed: Apr. 1, 2017

(86) PCT No.: PCT/CN2017/079340
§ 371 (c)(1),
(2) Date: Aug. 23, 2018

(87) PCT Pub. No.: WO2017/219727
PCT Pub. Date: Dec. 28, 2017

(65) Prior Publication Data
US 2019/0063903 A1 Feb. 28, 2019

(30) Foreign Application Priority Data

Jun. 24, 2016 (CN) .......................... 2016 1 0474839

(51) Int. Cl.
*G01B 11/08* (2006.01)
*G01N 21/88* (2006.01)
(Continued)

(52) U.S. Cl.
CPC .............. *G01B 11/08* (2013.01); *B66B 7/123* (2013.01); *B66B 7/1238* (2013.01); *G01B 7/107* (2013.01);
(Continued)

(58) Field of Classification Search
CPC ...... G01B 11/08; G03H 1/0005; G01N 27/82; G01N 21/88
See application file for complete search history.

(56) References Cited

U.S. PATENT DOCUMENTS 4,827,216 A * 5/1989 Grimson ............ G01N 27/9033
324/225
5,087,822 A * 2/1992 Fairlie ................ G01N 21/8903
250/559.16
(Continued)

FOREIGN PATENT DOCUMENTS

CA          2003159 A     5/1991
CN        103163150 A     6/2013
(Continued)

OTHER PUBLICATIONS

International Search Report for Corresponding International Application No. PCT/CN2017/079340 (2 Pages) (dated Jun. 7, 2017).
(Continued)

Primary Examiner — Rebecca C Bryant
(74) Attorney, Agent, or Firm — Lucas & Mercanti, LLP

(57) ABSTRACT

A comprehensive information detection system for a steel wire rope, having a detection device, a stroke metering device, a data acquisition and conversion workstation, an alarm controller, and a terminal control master station is provided. The detection device further specifically has a steel wire rope electromagnetic detection device, a steel wire rope machine vision damage recognition device, a steel wire rope machine vision diameter measurement device, and a damage location marking device. The comprehensive information detection system for a steel wire rope may perform comprehensive evaluation on the damage situation of the steel wire rope and refine damage data information, thereby
(Continued)

comprehensively improving the refinement degree of detection and the detection accuracy.

10 Claims, 10 Drawing Sheets

(51) Int. Cl.

| | | |
|---|---|---|
| *G01B 7/06* | (2006.01) | |
| *G01N 21/952* | (2006.01) | |
| *B66B 7/12* | (2006.01) | |
| *G01B 11/10* | (2006.01) | |
| *G01B 11/24* | (2006.01) | |
| *G01B 7/12* | (2006.01) | |
| *G01N 27/82* | (2006.01) | |
| *G03H 1/00* | (2006.01) | |

(52) U.S. Cl.
CPC ............ *G01B 7/125* (2013.01); *G01B 11/105* (2013.01); *G01B 11/2433* (2013.01); *G01N 21/88* (2013.01); *G01N 21/952* (2013.01); *G01N 27/82* (2013.01); *G03H 1/0005* (2013.01)

(56) References Cited

U.S. PATENT DOCUMENTS

| | | | |
|---|---|---|---|
| 2014/0035569 A1 | 2/2014 | Yoshioka et al. | |
| 2018/0062340 A1* | 3/2018 | Pechter | .............. H01R 43/0249 |

FOREIGN PATENT DOCUMENTS

| | | |
|---|---|---|
| CN | 103562715 A | 2/2014 |
| CN | 103896122 A | 7/2014 |
| CN | 103994998 A | 8/2014 |
| CN | 104515777 A | 4/2015 |
| CN | 106018544 A | 10/2016 |
| CN | 205720094 U | 11/2016 |
| JP | 2008214037 A | 9/2008 |

OTHER PUBLICATIONS

Office Action for Corresponding Chinese Patent Application No. 201610474839.8 (7 Pages).
Chinese Search Report for Corresponding Chinese Application No. 201610474839.8 (1 Page).
European Search Report for Corresponding European Application No. EP178144663 (61 Pages) (dated Jun. 6, 2019).

* cited by examiner

COMPREHENSIVE INFORMATION DETECTION SYSTEM FOR STEEL WIRE ROPE

CROSS-REFERENCE TO RELATED APPLICATIONS

This application is a 371 U.S. of PCT/CN2017/079340 filed Apr. 1, 2017, which claims the priority of Chinese Patent Application No. 201610474839.8 filed Jun. 24, 2016, the contents of each of which are incorporated herein by reference.

FIELD OF THE INVENTION

The present disclosure relates to the technical field of detection damage of a steel wire rope, particularly to a comprehensive information detection system for a steel wire rope.

BACKGROUND OF THE INVENTION

As a key member of equipment for hoisting, craning, lifting, pulling, carrying and the like, steel wire ropes are widely used in various fields (for example, mine elevators, petroleum drill and workover rigs, ropeways, cable cars, cranes, bridge slings, elevators, pulling cables, fixing cables, track cables and so on) of the national economy. For a long period of time, due to lack of scientific and effective comprehensive detection means, safe use of the steel wire ropes is always a difficult problem in safety management. The steel wire ropes spiral bundles of steel wires that meet requirements in mechanical performances and geometric dimension and twisted together according to a certain rule. The steel wire ropes are ropes formed by firstly twisting a plurality of steel wires into a strand, then twisting a certain number of strands into a spiral shape with a rope core as a center. The steel wire ropes are used for lifting, pulling, tensioning and holding in machinery for conveying materials (or other articles). The steel wire ropes, with a high strength and a light self-weight, are stable and reliable in operation, and are not prone to overall sudden breaks.

However, once in a damaged state, the steel wire ropes will seriously threaten the industrial production (i.e. serious damage is likely to cause breaks of the steel wire ropes), and even bring about serious accidents to safety production; in this regard, nondestructive detection for the steel wire ropes is of critical importance; generally, according to national standards, damage detection for the steel wire ropes mainly includes more than 20 items of damage detection, for example, extruding-out of steel wire, extruding-out of a rope core of a single-strand steel wire rope, local reduction of diameter of a steel wire rope, extruding-out/torsion of a rope strand, local flattening, tangling up, wavy deformation, bending, cage-like distortion, external corrosion, external wearing and internal wearing, broken surface wire, internal broken wire, fatigue of steel wire and others.

In the prior art, there are mainly three methods for detection a steel wire rope (i.e. manual vision detection, manual measurement with a caliper and detection with nondestructive equipment);

For the first method, in a process of manufacturing or using the steel wire ropes, an operator samples possible external and structural damages of the steel wire ropes (i.e. tests extruding-out of steel wire, extruding-out of a rope core of a single-strand steel wire rope, tangling up, wavy deformation, bending, broken wire and other items of damage that possibly occur) only in a manual vision manner with naked eyes;

For the second method, the steel wire ropes are only manually sampled with a caliper for possible structural damages (i.e. structural damages such as changes of the diameter of the steel wire rope are determined (for example, local reduction of the diameter of the steel wire ropes) by detection a dimension of diameter of the steel wire ropes);

For the third method, nondestructive equipment based on an electromagnetic principle is used alone to perform nondestructive detection for the steel wire ropes, which can detect various damages of the steel wire ropes, such as broken wire, wearing, rusting, fatigue and so on; but for defects that require vision recognition, such as increasing and decreasing of geometric dimension of diameter of the steel wire ropes, number of broken wires on surface of 6d, 30d steel wire ropes, surface rusting, and type of external damage, this method can do nothing. Although the manner of manual vision detection, and the manner of measuring the diameter with a caliper have technical defects such as serious omission, low efficiency, high labor intensity and so on, they yet have some suitable reasons. For example, through vision detection, the number of broken wires on surfaces of 6d, 30d steel wire ropes can be definitely determined (this is of great importance, because quantitative regulations for discarding broken wires on a surface are provided in the standards for detection the steel wire ropes in various countries). Manually detection the diameter with a caliper is indeed an effective method for detection a value of shrinkage of diameter of the steel wire rope; therefore, solely using the electromagnetic nondestructive equipment to detect damage of the steel wire ropes still cannot satisfy the technical requirements of comprehensive synthesis damage detection.

At present, some users detect the steel wire ropes using the electromagnetic nondestructive equipment, and they believe that the method of manual vision detection and the detection method with a caliper are lower in efficiency, and quite outdated in technologies; researches reveal that there is no all-round, efficient, and accurate nondestructive detection equipment integrating three detection functions of vision detection, diameter change detection, and nondestructive detection (besides, a function of marking a damage location is also lacked). Therefore, the conventional technologies, which are not high in detection accuracy, insufficient in refinement degree, low in detection efficiency, cannot satisfy regulations of standards for detection the steel wire ropes of various countries and requirement for a detection site, further seriously affect the quality of the detection of the steel wire ropes, thus easily causing erroneous detection and omission, thus no assurance for detection the steel wire ropes with higher safety can be provided.

To sum up, how to overcome the above technical defects of the systems for detection damage of the steel wire ropes in the conventional technologies is a technical problem that urgently needs to be solved by a person skilled in the art.

SUMMARY OF THE INVENTION

A comprehensive information detection system for a steel wire rope provided in the present disclosure is intended to overcome the above technical defects. In order to achieve the above object, technical solutions of the present disclosure are realized as follows:

A comprehensive information detection system for a steel wire rope provided in the present disclosure includes a detection device, a stroke metering device, a data acquisition and conversion workstation, an alarm controller, and a terminal control master station; the data acquisition and conversion workstation is communication interface connected as well as conductive wire coupled respectively to the terminal control master station, the detection device, the stroke metering device, and the alarm controller;

the detection device specifically includes a steel wire rope electromagnetic detection device, a machine vision damage recognition device for a steel wire rope, a machine vision diameter measurement device for a steel wire rope, and a damage location marking device;

in the above, the steel wire rope electromagnetic detection device (i.e. nondestructive inspection detection equipment) includes an electromagnetic sensor detection device, a Hall element detection device, and an induction coil detection device; the steel wire rope electromagnetic detection device is configured to perform real-time detection for a steel wire rope in linear motion in a manner of nondestructive inspection; if a damage is detected at a location on the steel wire rope based on a result of the real-time detection, determine the location with the damage as a target to location; and the steel wire rope electromagnetic detection device is further configured to send, upon the detection of the target location on the steel wire rope where the damage exists, a starting signal to activate the machine vision damage recognition device for a steel wire rope, the machine vision diameter measurement device for a steel wire rope, and the damage location marking device to perform respective operations on the steel wire rope at the target location;

the machine vision damage recognition device for a steel wire rope includes a case, an image acquisition device (i.e. a video equipment or photographing equipment) and an illumination light source generation device that are provided inside the case; the illumination light source generation device is configured to activate, upon reception of the starting signal, the illumination light source generation device, so as to provide an illumination light source to an enclosed space inside the case (thus ensuring smooth performance of the image acquisition device); the image acquisition device is configured to perform, upon receiving the starting signal, image acquisition for the steel wire rope at the target location (i.e. current location tested through the nondestructive inspection), then output an image by display equipment for user's manual recognition and judgment about whether an external defect exists on the steel wire rope at the target location;

the machine vision diameter measurement device for a steel wire rope includes a case, and a shadow image acquisition device (i.e. a photographing equipment) and a parallel light source generation device that are provided inside the case; the parallel light source generation device is an illumination device capable of generating parallel light beams; the parallel light source generation device is configured to be activated upon reception of the starting signal, and emit parallel light beams to the steel wire rope at the target location; the shadow image acquisition device is configured to, upon reception of the starting signal, acquire a shadow image of the steel wire rope at the target location formed under irradiation of the parallel light beams, and calculate value of a diameter of the steel wire rope at the target location by acquiring a range of diameter of the shadow image, so as to determine whether the diameter of the steel wire rope at the target location changes;

the damage location marking device is configured to be activated upon reception of the starting signal, to perform an action of mark spraying to the steel wire rope at the target location.

Preferably, as an implementable solution, the steel wire rope electromagnetic detection device is specifically configured to detect in real time the steel wire rope at a current location, and obtain a detection waveform of the steel wire rope at the current location, determine if the detection waveform of the steel wire rope at the current location reaches a waveform height threshold, and if so, recognize the current location as the target location with the damage; the steel wire rope electromagnetic detection device is further configured to detect the steel wire rope at the target location, and obtain a nondestructive inspection detection report; the steel wire rope electromagnetic detection device is further configured to display and output the nondestructive inspection detection report through display equipment; the nondestructive inspection detection report comprises a primary report and a secondary report; the primary report comprises a total detection length, an overall damage quantity and a steel wire rope joint name, and length, location, magnitude, necking and type of important damages of the steel wire rope; the secondary report comprises a sequence list of damage and the detection waveform.

Preferably, as an implementable solution, the machine vision damage recognition device for a steel wire rope further includes an image recognition and processing device; the image recognition and processing device is configured to, upon reception of the starting signal, perform image acquisition for the steel wire rope at the target location, to obtain an image of the target location, and determine, upon image matching and image differentiation between an image acquisition sample of the steel wire rope at the target location and a damage sample database, whether the steel wire rope at the target location has a damage, and further determine a specific type and quantity of the damage of the steel wire rope at the target location.

Preferably, as an implementable solution, the machine vision damage recognition device for a steel wire rope further includes the damage sample database; the damage sample database specifically stores multiple damage samples.

Preferably, as an implementable solution, the image acquisition device specifically is a video equipment or photographing equipment.

Preferably, as an implementable solution, the shadow image acquisition device specifically is a video equipment or photographing equipment.

Preferably, as an implementable solution, the parallel light source generation device specifically is an LED illumination device.

Preferably, as an implementable solution, the damage location marking device specifically is automatic paint spraying equipment, and the automatic paint spraying equipment is electrically coupled to the detection device.

Preferably, as an implementable solution, the comprehensive information detection system for a steel wire rope further includes an voice and light alarm device; the alarm controller is configured to receive the starting signal, and simultaneously activate the voice and light alarm device to perform a flash alarm operation and a ringing alarm operation.

Preferably, as an implementable solution, the comprehensive information detection system for a steel wire rope further includes a stroke metering device; the stroke metering device is configured to detect a length of the current steel wire rope at the target location.

Comprised with the prior art, the embodiments of the present disclosure have the following advantages:

For the comprehensive information detection system for a steel wire rope provided in the present disclosure, it can be seen from the analysis of the main constructions of the above product that this comprehensive information detection system for a steel wire rope is mainly consisted of the detection device, the stroke metering device, the data acquisition and conversion workstation, the alarm controller, and the terminal control master station, wherein the detection device is specifically consisted of the steel wire rope electromagnetic detection device, the machine vision damage recognition device for a steel wire rope, the machine vision diameter measurement device for a steel wire rope, and the damage location marking device;

The comprehensive information detection system for a steel wire rope of the present disclosure, which introduces the three items, i.e. the steel wire rope electromagnetic detection device, the machine vision damage recognition device for a steel wire rope, and the machine vision diameter measurement device for a steel wire rope, and integrates the three functions of nondestructive inspection detection, vision detection, and detection of diameter changes (even with the function of marking damage location), can comprehensively determine and evaluate the damage situation of the steel wire ropes and refine damage data information, thus further comprehensively improving a degree of refinement of the detection and detection accuracy, moreover, a damage detection rate is extremely high, thus ensuring quality of the detection for the steel wire ropes, and avoiding technical problems such as to erroneous detection and omission, in summary, the comprehensive information detection system for a steel wire rope provided in the present disclosure provides safer and more reliable technical assurances for detection the steel wire ropes.

DESCRIPTION OF REFERENCE SIGNS

Figure 1:
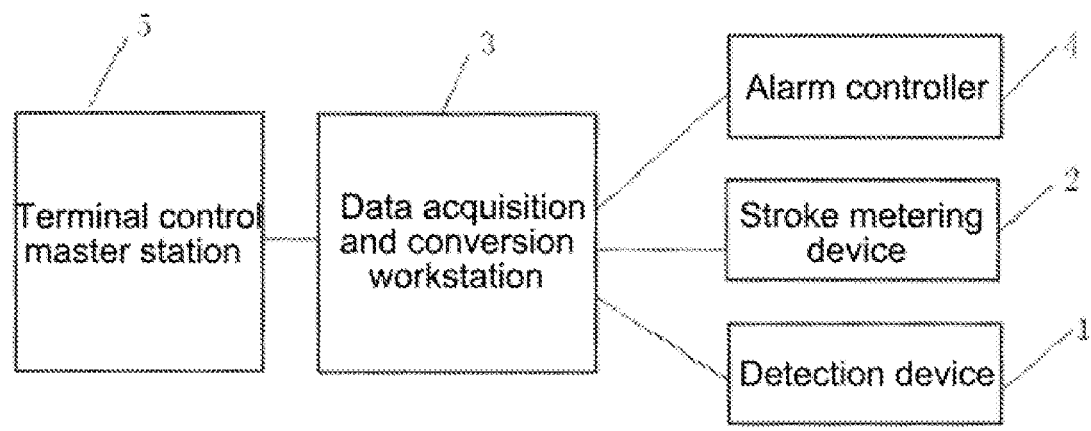
FIG. 1 is a schematic structural diagram of a principle of a comprehensive information detection system for a steel wire rope provided in an embodiment of the present disclosure.

Detection device 1; stroke metering device 2; data acquisition and conversion workstation 3; alarm controller 4; terminal control master station 5; steel wire rope A;

In structure of the detection device 1: 11 steel wire rope electromagnetic detection device; 111 mount support; 112 detection probe; 113 loading probe; 114 permanent magnetic body; 115 Hall element; 116 induction coil; 12 machine vision damage recognition device for a steel wire rope; 121 case; 122 image acquisition device; 123 illumination light source generation device; 124 reflector; 13 machine vision diameter measurement device for a steel wire rope; 131 case; 132 shadow image acquisition device; 133 parallel light source generation device; 14 damage location marking device;

In structure of the stroke metering device 2: 21 photoelectric encoder; 22 friction roller; 23 connecting means;

In structure of the data acquisition and conversion workstation 3: 31 mount base plate; 32 trunking; 33 stroke and alarm controller; 34 isolation transformer; 35 power supply filter; 36 secondary power supply air switch; 37 fuse; 38 connecting terminal board; 39 data conversion processor;

In structure of the terminal control master station 5: 51 cabinet; 52 liquid crystal display; 53 mouse; 54 industrial personal computer (IPC); 55 voice and light alarm device; 56 association signal acquisition circuit box.

DETAILED DESCRIPTION OF THE INVENTION

Below the present disclosure is further described in detail through embodiments in combination with accompanying drawings. Examples of the embodiments are shown in the accompanying drawings, in which like or similar signs represent like or similar elements or elements having like or similar functions throughout the accompanying drawings. The embodiments described below with reference to the accompanying drawings are exemplary, aiming at explaining the present disclosure, but cannot be construed as limitation to the present disclosure.

In the description of the present disclosure, it should be understood that orientational or locational relationships indicated by terms "length", "width", "upper", "lower", "front", "back", "left", "right", "vertical", "horizontal", "top", "bottom", "inner", "outer" and so on are based on orientational or locational relationships shown in the accompanying drawings, merely for facilitating describing the present disclosure and simplifying the description, rather than indicating or suggesting that related devices or elements have to be in a specific orientation or configured and operated in a specific orientation, therefore, they should not be construed as limitation to the present disclosure.

In the present disclosure, unless otherwise specified and defined explicitly, terms "mount", "join", "connect", "fix" and so on should be construed in a broad sense. For example, it may be fixed connection, detachable connection, or integrated connection; it may be mechanical connection or electrical connection; it may be direct connection or indirect connection through an intermediate medium; it may be an inner communication between two elements or interaction relationship between two elements. For a person ordinarily skilled in the art, specific meanings of the above-mentioned terms in the present disclosure can be understood according to specific circumstances.

Figure 2:
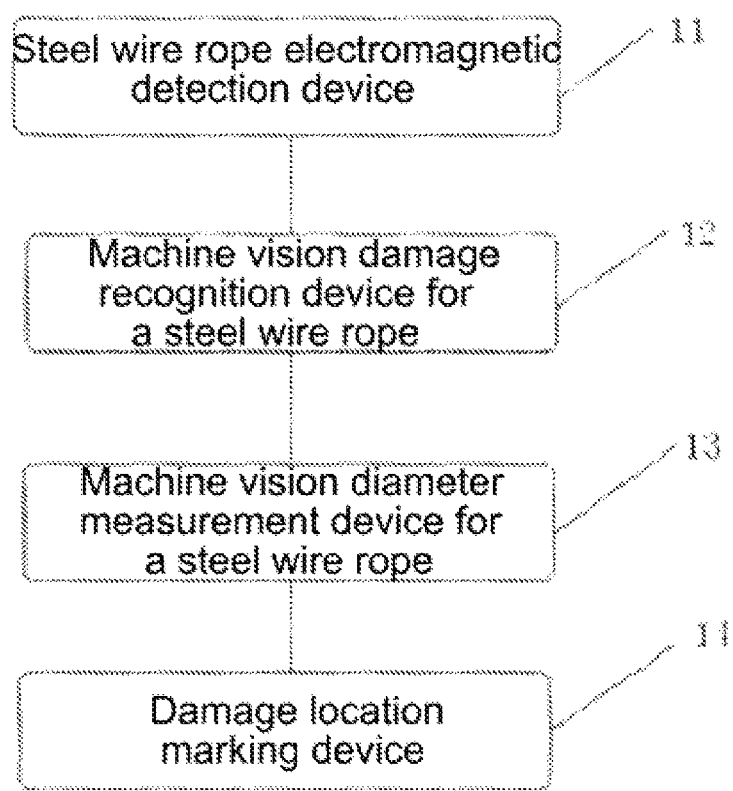
FIG. 2 is a schematic structural diagram of a principle of a detection device in the comprehensive information detection system for a steel wire rope provided in an embodiment of the present disclosure.

Referring to FIG. 1, a comprehensive information detection system for a steel wire rope provided in an embodiment of the present disclosure includes a detection device 1, a stroke metering device 2, a data acquisition and conversion workstation 3, an alarm controller 4, and a terminal control master station 5; the data acquisition and conversion workstation 3 is communication interface connected as well as conductive wire coupled respectively to the terminal control master station 5 (i.e., implementing control over analysis and feedback of central data), the detection device 1, the stroke metering device 2, and the alarm controller 4; referring to the principle diagram of FIG. 1, the data acquisition and conversion workstation 3 is coupled to the detection device 1, the stroke metering device 2, and the alarm controller 4, respectively, i.e., to realize signal transmission and data acquisition and conversion; the data acquisition and conversion workstation 3 is further coupled to the terminal control master station 5, to provide acquired data to the terminal control master station 5;

the detection device 1 specifically includes a steel wire rope electromagnetic detection device 11, a machine vision damage recognition device 12 for a steel wire rope, a machine vision diameter measurement device 13 for a steel wire rope, and a damage location marking device 14 (further referring to FIG. 2);

in the above, the steel wire rope electromagnetic detection device 11 (i.e. nondestructive detection equipment) includes an electromagnetic sensor detection device, a Hall element detection device, and an induction coil detection device; the steel wire rope electromagnetic detection device is configured to perform real-time detection for a steel wire rope A in linear motion in a manner of nondestructive inspection; if a damage is detected at a location on the steel wire rope A based on a result of the real-time detection, determine the location with the damage as a target location and the steel wire rope electromagnetic detection device is configured to send, upon the detection of n the target location on the steel wire rope A where the damage exists, a starting signal (i.e., specifically, a wave trigger signal) to activate the machine vision damage recognition device for a steel wire rope, machine vision diameter measurement device for a steel wire rope, and damage location marking device to perform respective operations on the steel wire rope at the target location;

the machine vision damage recognition device 12 for a steel wire rope includes a case 121, an image acquisition device 122 (i.e. a video equipment or photographing equipment) and an illumination light source generation device 123 provided inside the case 121; the illumination light source generation device 123 (i.e. an arc-shape illuminating lamp illustrated in FIG. 6) is configured to activate upon reception of the starting signal, the illumination light source generation device, so as to provide an illumination light source to an enclosed space inside the case, thus ensuring smooth performance of the image acquisition device; the above reflector 124 assists, based on the reflection principle, the image acquisition device 122 in performing image acquisition in another two angles of view; the image acquisition device 122 is configured to perform, upon reception of the starting signal, image acquisition for the steel wire rope A at the target location (i.e. in the current location tested upon the nondestructive inspection), then output an image through display equipment for user's manual recognition and judgment about whether an external defect exists on the steel wire rope at the target location;

the machine vision diameter measurement device 13 for a steel wire rope includes a case 131, and a shadow image acquisition device 132 and a parallel light source generation device 133 that are provided inside the case 131; the parallel light source generation device 133 is an illumination device capable of generating parallel light beams; the parallel light source generation device 133 is configured to be activated upon reception of the starting signal, and emit parallel light beams to the steel wire rope A at the target location; the shadow image acquisition device 132 is configured to, upon reception of the starting signal, acquire a shadow image of the steel wire rope A at the target location formed under irradiation of the parallel light beams, and calculate a numerical value of a diameter of the steel wire rope A at the target location by acquiring a range of diameter of the shadow image, so as to determine whether the diameter of the steel wire rope A at the target location changes;

the damage location marking device 14 is configured to be activated upon reception of the starting signal, to perform an action of mark spraying to the steel wire rope A at the target location.

It should be indicated that the above comprehensive information detection system for a steel wire rope is mainly consisted of the detection device, the stroke metering device, the data acquisition and conversion workstation, the alarm controller, and the terminal control master station; wherein the detection device is mainly consisted of the steel wire rope electromagnetic detection device, the machine vision damage recognition device for a steel wire rope, the machine vision diameter measurement device for a steel wire rope, and the damage location marking device; in the structure of the above comprehensive information detection system for a steel wire rope, the steel wire rope electromagnetic detection device (i.e., which specifically realizes the electromagnetic damage detection for a steel wire rope), the machine vision damage recognition device for a steel wire rope, and the machine vision diameter measurement device for a steel wire rope (i.e., which realizes measurement and recognition of a diameter) are combined, with three functions of non-destructive inspection detection, vision detection, and detection of diameter changes being integrated, thus a damage situation of the steel wire rope can be synthetically determined and evaluated and damage data information can be refined, further comprehensively improving a degree of refinement of the detection and detection accuracy, moreover, a damage detection rate is extremely high, thus ensuring quality of the detection for the steel wire ropes.

Below specific construction and specific technical effects of the comprehensive information detection system for a steel wire rope provided in the embodiments of the present disclosure are explained in details:

in the specific construction of the steel wire rope electromagnetic detection device:

The above steel wire rope electromagnetic detection device 11 (i.e. nondestructive inspection equipment)

includes the electromagnetic sensor detection device, the Hall element detection device, and the induction coil detection device; apparently, the comprehensive information detection system for a steel wire rope provided in the embodiments of the present disclosure integrates the constructions of three types of nondestructive inspection equipment; the conventional nondestructive inspection equipment mostly uses one of the manners to perform the nondestructive inspection detection, but the comprehensive information detection system for a steel wire rope provided in the embodiments of the present disclosure, which integrates advantages of the three types of nondestructive inspection detection, can perform comprehensive and authoritative nondestructive inspection detection for the steel wire ropes.

In the above specific structure, the electromagnetic sensor detection device is configured to perform damage detection for the steel wire ropes in a flux-weakening manner; the Hall element detection device is configured to perform damage detection for the steel wire ropes through a Hall effect; the induction coil detection device is configured to perform damage detection for the steel wire ropes through an inductance coil technology; a magnetic field sensor, which realizes conversion between magnetic and electrical signals, is a core of magnetic nondestructive detection technologies, determines multiple performances of a tested electrical signal, such as signal to noise ratio, resolution, and stability and so on, and further determines performances of a magnetic detection device or system; different magnetoelectric conversion elements and magnetic field measurement methods will result in different probe structures and detection performance indexes. Therefore, the choice of the magnetic field sensor is the foundation and the key to magnetic field detection technologies.

Viewing from practical applications, several following elements should be comprehensively considered for the selection of a magnetically sensitive component and a magnetic field measurement principle: sensitivity, measurement range, spatial resolution, frequency bandwidth, and so on. Different magnetic measurement principles or elements can be adopted for measuring a relatively flux-weakening field. A magnetic field is usually converted into an electrical signal, and then automated processing is realized. In practical detection, the magnetoelectric conversion principles and element applications usually include the following three types:

1. Induction coil an induction voltage is generated by cutting a magnetic line of force with a coil. A magnitude of an induction voltage has a linear relationship with the number of turns of the coil, a rate of changes of flux passing through the coil or a velocity of cutting a magnetic induction line by the coil. The induction coil measures a relative change quantity of the magnetic field, and is more sensitive to high-frequency magnetic field signals in a spatial domain. According to different measurement objects, the induction coil can be in various forms. The number of turns of the coil and a relative movement velocity determine the sensitivity of measurement; a geometrical shape and dimension of coil winding determine the spatial resolution, coverage range, effective information ratio of the measurement and so on.

2. Hall element: the Hall element operates on the principle of Hall effect, and measures and determines the magnitude of the magnetic field. The sensitivity, the spatial resolution, the coverage range of elements and so on all depend on geometrical dimension, shape, and crystalline properties of a sensitive area thereof.

3. Magnetically sensitive resistor: a magnetically sensitive resistance sensor converts a magnetic field change into an electrical signal through a magnetic resistance sensitive element, and outputs the electrical signal. The magnetically sensitive resistor, whose sensitivity is about 20 times that of a Hall element die, has a relatively broad range of operating temperature. The spatial resolution and so on are related to an induction area of the element.

The above steel wire rope electromagnetic detection device (i.e. the nondestructive inspection equipment) is mainly used for daily nondestructive detection of the steel wire ropes, has a relatively broad range of detection, and can detect the steel wire ropes with a diameter in a range of 2-200 mm and so on.

The above steel wire rope electromagnetic detection device (i.e. the nondestructive inspection equipment) can accurately analyze internal damage and external damage of the steel wire ropes by monitoring changes of magnetization and demagnetization of the steel wire ropes based on principles of permanent magnetic detection, and magnetic flux leakage (flux-weakening) detection. The flux-weakening detection technology is a type of electromagnetic nondestructive detection technology fulfilling located, qualitative, and quantitative recognition of various internal and external defects of the steel wire ropes. In accordance with the principle of checking safe bearing capability of a steel wire rope in international standards and norms, through extraction of information of changes of physical field of ferromagnetic materials, and single-valued equivalent mapping of comprehensive degradation characteristics of volume element of ferromagnetic materials on the steel wire ropes, thus scientific technical bases are provided for systematically evaluating overall tensile/anti-bending/anti-torsion bearing performances, safe service life, and safe load coefficient of the steel wire ropes. The volume element is a volume differential of the steel wire rope along an axial direction. The comprehensive degradation characteristics of loaded materials inside the volume element comprehensively reflect loss of metallic cross-sectional area (LMA) and local flaw (LF) of the steel wire ropes.

In the flux-weakening detection method, a given weak electromagnetic field is introduced and modulated, to form a physical field association with a flux-weakening field of a steel wire rope having undergone flux-weakening programming. Thus, the sensor has prominent technical characteristics of background-noise-free operation in a flux-weakening state, lift-off self-inhibitory wide-distance induction, high sensitivity/high resolution/high-velocity spatial domain response and so on. To sum up, a process of realizing the flux-weakening detection is: flux-weakening programming—flux-weakening detection—data processing and so on.

Besides, the nondestructive inspection technology for the steel wire ropes with the adoption of electromagnetic detection mainly has the following advantages: 1. comprehensiveness of signal acquisition: the detection is carried out by using highly sensitive Hall element, magnetic induction coil or flux-weakening sensor and so on. 2. better characterization of signal acquisition: signals of different characteristics such as broken wire signal, wearing signal, external environment influence and so on can be completely reflected (i.e. all of them can be reflected by signal waveforms). 3 filterability of signal acquisition: the system can effectively filter acquired signals, guaranteeing the accuracy. 4. apart from a real-time output mode, first detection, and then downloading also can be used, that is, data is acquired and stored on site using a data storage, after the detection is ended, the data storage is separated from a detection magnetic head and taken away, thus facilitating download of data. 5. real-time check and detection of waveform at a detection time, wherein when a defect signal is confronted with, the defect signal is recorded, stored and so on.

Besides, the above steel wire rope electromagnetic detection device is further specifically configured to detect in real time the steel wire rope at a current location, and obtain a detection waveform of the steel wire rope at the current location, determine if the detection waveform of the steel wire rope at the current location reaches a waveform height threshold, and if so, recognize the current location as the target location with the damage; the steel wire rope electromagnetic detection device is further configured to detect the steel wire rope at the target location, and obtain a nondestructive inspection detection report; the steel wire rope electromagnetic detection device is further configured to display and output the nondestructive inspection detection report through display equipment; the nondestructive inspection detection report includes a primary report and a secondary report; the primary report includes a total detection length, an overall damage quantity and a steel wire rope joint name, and length, location, magnitude, necking and type of important damages of the steel wire rope; the secondary report includes a sequence list of damage and the detection waveform.

It should be indicated that the above steel wire rope electromagnetic detection device performs the detection according to the detection waveform, and if a current detection waveform reaches a certain waveform height threshold, the current location is determined as a target location with damage, and meanwhile the image acquisition device will be activated (i.e., triggered and activated by a trigger signal) to take a photo or video. At the same time, the steel wire rope electromagnetic detection device also will give a nondestructive inspection detection report according to the detection situation, and display and output the nondestructive inspection detection report through the display equipment.

The above display equipment (i.e. combining a personal computer or an industrial personal computer with a software interface, simultaneously with the use of the data acquisition and conversion workstation in cooperation) not only can display an image of the steel wire rope at the target location, but also meanwhile can display a detection waveform thereof, and at the same time also can display the nondestructive inspection detection report and other data.

The nondestructive inspection detection report includes the primary report and the secondary report;

The primary report includes the total detection length, the overall damage quantity and the steel wire rope joint name, and length, location, magnitude, necking and type of important damages of the steel wire rope. The above primary report mainly involves the following contents (parameters): area of a damage, type of the damage; for example, type LF (local flaw) damage, type LMA (loss of metallic cross-sectional area) damage, and so on.

The above secondary report also includes many types, and one of them is the sequence list of damage. The above sequence list of damage is a digitalized analysis report, for example, it can show that a damage at 100 meters, with a damage magnitude (i.e., quantity of loss of metallic cross-sectional area) of 3% is tested; the secondary report further includes the detection waveform, and a location and damage situation of the steel wire rope are reflected by the detection waveform. The waveform, the location and so on have some special meanings. If a distance from a starting point to an end point of a waveform is relatively short and a wave amplitude is relatively high, it is determined as damage of broken wire; if the distance from the starting point to the end point of the waveform is relatively long, it is determined as wearing, rusting or other damages. Apparently, the above steel wire rope electromagnetic detection device can fulfill qualitation and locating of damages.

Upon detection of the damage by the steel wire rope electromagnetic detection device, the machine vision damage recognition device for a steel wire rope can simultaneously perform the machine vision damage recognition. Specifically, a picture is taken for the steel wire rope by the image acquisition device, then specific damage situation on the surface of the steel wire rope can be clearly figured out through an output image picture. For example, a lay length, quantity of broken wires, and other damages are clear. Therefore, more precise qualitative and quantitative detection of the damage can be performed effectively by the steel wire rope electromagnetic detection device and the machine vision damage recognition device for a steel wire rope.

Besides, upon detection of the damage by the steel wire rope electromagnetic detection device through the nondestructive inspection detection, the detection of diameter is realized by the machine vision diameter measurement device for a steel wire rope: the parallel light source generation device emits parallel light beams to a to-be-tested steel wire rope at a certain location, then a numerical value of a diameter of the steel wire rope at the current location is calculated by acquiring a range of diameter of a shadow; the quantitative analysis of loss of the diameter of the steel wire rope is further completed by determining the numerical value of the diameter of the steel wire rope.

Therefore, by integrating the three functions, i.e. the steel wire rope electromagnetic detection device, the machine vision damage recognition device for a steel wire rope, and the machine vision diameter measurement device for a steel wire rope, located, qualitative, and quantitative analysis of the damage of the steel wire rope can be effectively realized.

In the specific construction of a machine vision damage recognition device for a steel wire rope:

The machine vision damage recognition device for a steel wire rope further includes an image recognition and processing device;

the image recognition and processing device is configured to, upon reception of the starting signal, perform image acquisition for the steel wire rope at the target location, obtain an image of the target location, and judge, upon image matching and image differentiation between an image acquisition sample of the steel wire rope at the target location and a damage sample database, whether the steel wire rope at the target location has a damage, and further determine a specific type and quantity of the damage of the steel wire rope at the target location. The machine vision damage recognition device for a steel wire rope further includes the damage sample database; and the damage sample database specifically stores multiple damage samples.

Besides, the image acquisition device specifically is video equipment or photographing equipment.

It should be indicated that the machine vision damage recognition device for a steel wire rope provides two vision processing manners. On one hand, image information (i.e. photo or video) can be directly output for operators to perform recognition in a vision recognition manner with naked eyes; on the other hand, automatic recognition can be performed by the image recognition and processing device by software such as the terminal control master station. That is, after image matching and image differentiation are performed between the image acquisition sample of the steel wire rope at the target location and the damage sample database by the image recognition and processing device, if the image matching between the damage of the steel wire rope at the current target location and a certain type of steel wire rope damage in the damage sample database (for example, matching between image gray-scale histograms) is successful, the damage of the steel wire rope at the current target location can be determined as this type of steel wire rope damage, and further the specific damage type of the steel wire rope is determined. Meanwhile, the manner of complete machine vision recognition is better, more advanced, and more efficient, and at the same time, the detection rate of the steel wire rope damage is higher.

In the specific construction of the machine vision diameter measurement device for a steel wire rope:

The shadow image acquisition device specifically is video equipment or photographing equipment. The parallel light source generation device specifically is an LED illumination device.

It should be indicated that the above parallel light source generation device is consisted of an LED light source, a lens group, a homogenizing rod, a diaphragm, and a collimating lens. Light from the light source is converged by the lens group into a light spot of a certain size. Since the LED light source has a very big angle of divergence, the lens should have a relatively small focal length and a relatively big relative aperture, so as to collect more optical energies, and reduce the structural dimension. The light spot has very high light intensity in a center, but the light intensity is not distributed uniformly, then by providing the homogenizing rod here, light enters the homogenizing rod and is reflected repeatedly, and finally overlaps on a rear end, to obtain relatively uniform output, and the light beams, after passing through the diaphragm, are emitted in parallel through the collimating lens.

In the specific construction of the damage location marking device:

The damage location marking device specifically is automatic paint spraying equipment, and the automatic paint spraying apparatus is electrically coupled to the detection device. It should be indicated that the damage location marking device is the last device for supplementarily spraying the paint, thus, the damage location can be effectively marked, facilitating the operator to find the damage location of the steel wire rope.

In the structure of the comprehensive information detection system for a steel wire rope provided in the present disclosure, in general;

The above steel wire rope electromagnetic detection device (i.e. the nondestructive inspection equipment) still realizes the function of nondestructive inspection detection, meanwhile, upon detection of the damage of the steel wire rope, the steel wire rope electromagnetic detection device sends the trigger signal (i.e. gives one trigger electrical signal to subsequent equipment), to trigger the subsequent machine vision damage recognition device for a steel wire rope, machine vision diameter measurement device for a steel wire rope, and damage location marking device to implement corresponding functions of image acquisition vision detection, diameter detection, damage location marking, and so on.

Specifically, the steel wire rope electromagnetic detection device performs real-time detection for the steel wire ropes in linear motion in a manner of nondestructive inspection; if a damage is detected at a location on the steel wire rope based on a result of the real-time detection, determine the location with the damage as the target location and upon the detection of the target location on the steel wire rope where the damage exists, sends the starting signal to activate the machine vision damage recognition device for a steel wire rope, machine vision diameter measurement device for a steel wire rope, and damage location marking device to perform respective operations on the steel wire rope at the target location;

In this process, the machine vision damage recognition device for a steel wire rope implements the vision recognition function, that is, the image acquisition device, upon reception of the starting signal, performs image acquisition for the steel wire rope at the current damage location, then outputs the image for a user to perform manual recognition and judgment (i.e. outputs the image to manually realize the vision recognition); besides, the vision recognition also can be automatically realized, through a software module, by means of the image recognition and processing technology, that is, the image matching and the image differentiation are performed for the image acquisition sample through the image processing technology, then whether there is a damage of the steel wire rope is determined; in this process, if a damage is tested by the steel wire rope electromagnetic detection device (i.e. the nondestructive inspection detection equipment), the illumination light source generation device is activated at the same time, to provide an illumination light source to the enclosed space inside the case, thus ensuring smooth performance of the image acquisition device (i.e. satisfying the requirements of illuminating the image acquisition device);

in this process, the machine vision diameter measurement device for a steel wire rope realizes the function of detection the diameter: if a damage is tested by the steel wire rope electromagnetic detection device (i.e. the nondestructive inspection detection equipment), the parallel light source generation device is activated simultaneously or in a delayed manner, then the parallel light source generation device emits parallel light beams to a to-be-tested steel wire rope at a certain location, then a numerical value of a diameter of the steel wire rope at the current location is calculated by acquiring a range of diameter of a shadow;

In this process, the damage location marking device specifically marks a damage location of the steel wire ropes, and when the damage is determined simultaneously by the nondestructive inspection equipment, the machine vision damage recognition device for a steel wire rope, and the machine vision diameter measurement device for a steel wire rope, an action of mark spraying is performed to the steel wire rope at the current location.

Apparently, after the qualitative and quantitative detection is performed for the damage situation of the steel wire rope by the steel wire rope electromagnetic detection device, the subsequent machine vision damage recognition device for a steel wire rope implements output of a vision image and the processing of image matching, which can achieve two technical objects, i.e. further secondarily verifying and determining the damage situation, and more importantly, facilitating further quantitative recognition of the damage situation of the steel wire rope;

afterwards, quantitative analysis of the necking situation of the steel wire rope is performed by the machine vision diameter measurement device for a steel wire rope, further realizing the recognition of diameter changes of the damage situation, thus determining the damage situation by determining the quantitative index of this target location, in this way, it is favorable to judging a stage of the life cycle of the steel wire rope, such that the steel wire rope achieves the greatest value, and a huge waste of utilization of the steel wire rope is reduced, in the premise of sufficiently ensuring safety of the steel wire rope.

Besides, different grades are specifically designed for the above detection device for dividing different damages into different grades, mainly including grade of common damage, grade of serious damage, discarding grade and so on; the above detection device, when detection a specific damage, can determine the grade of the damage according to different degrees of the damage, and automatically provide a formatted detection report. Specific contents involved in the embodiments of the present disclosure will not be repeated redundantly one by one.

In the specific construction of the comprehensive information detection system for a steel wire rope: the above comprehensive information detection system for a steel wire rope further includes an voice and light alarm device, the alarm controller is configured to receive the starting signal, and simultaneously activate the voice and light alarm device to perform a flash alarm operation and a ringing alarm operation. It should be indicated that audible and vision alarms commonly used in the field of industrial control can be selected as the above voice and light alarm device. The above to comprehensive information detection system for a steel wire rope further includes a stroke metering device; and the stroke metering device is configured to detect a length of a current steel wire rope and record a damage location.

Meanwhile, it should be supplemented that the comprehensive information detection system for a steel wire rope provided in the present disclosure, apart from relevant software modules, further needs to be implemented through cooperation with the master station, the data acquisition and conversion workstation, the stroke metering device, and other hardware devices; the hardware of the comprehensive information detection system for a steel wire rope provided in the present disclosure is consisted of five units, i.e. the detection device, the stroke metering device, the data acquisition and conversion workstation, the alarm controller, and the terminal control master station.

| | |
|---|---|
| terminal control master station | 3U case<br>LED lamp panel<br>Liquid crystal display (i.e. display equipment)<br>industrial computer<br>mouse<br>keyboard and other structures |
| data acquisition and conversion workstation | data processing converter<br>stroke and alarm controller<br>isolation transformer<br>power supply filter<br>2P air switch<br>fuse (with a seat) and other structures |
| stroke metering device | mainly including an encoder and other structures |
| steel wire rope electromagnetic detection device | detection probe<br>loading probe, Hall element probe, induction coil probe, detection support and other structures |
| machine vision damage recognition device for a steel wire rope and machine vision diameter measurement device for a steel wire rope | image acquisition device, shadow image acquisition device and so on |

The comprehensive information detection system for a steel wire rope provided in the present disclosure has the following structures and functions:

The comprehensive information detection system for a steel wire rope provided in the present disclosure is consisted of five units, i.e. the detection device, the stroke metering device, the data acquisition and conversion workstation, the alarm controller, and the terminal control master station, and tests a signal of residual magnetism on the steel wire ropes according to changes of situation of a spatial magnetic-field vector and law of motion through the flux-weakening detection technology. According to a to formula for checking a bearing capability of the steel wire ropes, the metallic cross-sectional area is a basic variable affecting the safe bearing capability of an in-service steel wire rope. A primary technical object achieved by the detection device is extracting and recognizing a reference quantity and a change quantity of an effective metallic cross-section area from the steel wire rope. On this basis, a residual bearing capability of the steel wire rope is determined correctly, such that the safe reliability of utilization of the steel wire rope is evaluated objectively.

The steel wire rope electromagnetic detection device 11 has three main structures (i.e. the electromagnetic sensor detection device, the Hall element detection device, and the induction coil detection device): the electromagnetic sensor detection device, the Hall element detection device, the induction coil detection device, the machine vision damage recognition device 12 for a steel wire rope, the machine vision diameter measurement device 13 for a steel wire rope, the stroke metering device 2, the data acquisition and conversion workstation 3, the terminal control master station 5, and the alarm controller 4.

Figure 3:
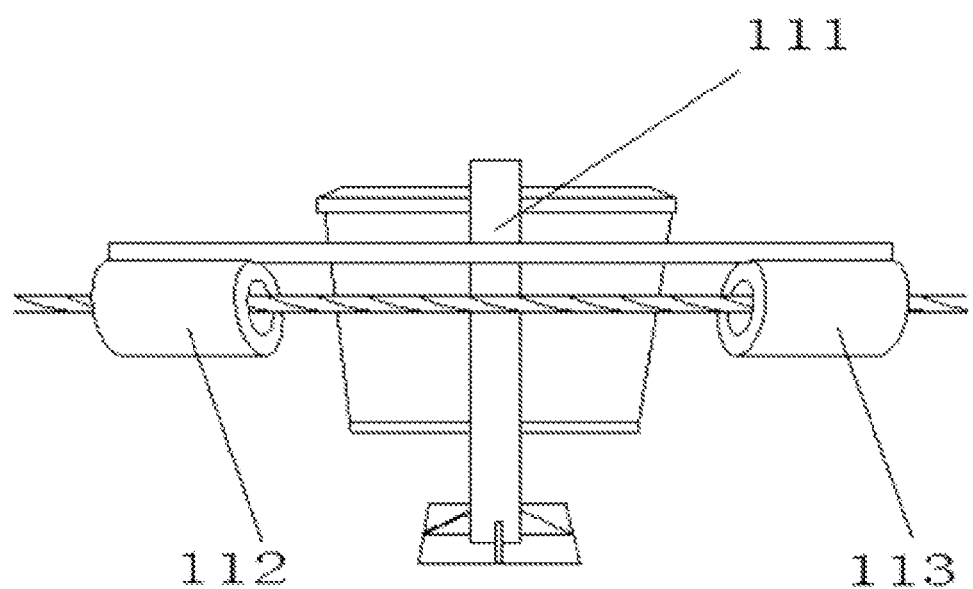
FIG. 3 is a schematic structural diagram of an electromagnetic sensor detection device in the comprehensive information detection system for a steel wire rope provided in an embodiment of the present disclosure.

Referring to FIG. 3, the electromagnetic sensor detection device is mainly consisted of a mount support 111, a detection probe 112, and a loading probe 113 and other structures; the above detection probe 112 specifically is a C-series detection probe, the loading probe 113 specifically is a JZ-series magnetic loading probe, and to each pair of the detection probe and the loading probe of the steel wire rope electromagnetic detection device realize on-line nondestructive detection of one measurement point of one steel wire rope.

It should be indicated that the steel wire rope electromagnetic detection device firstly implements a process of flux-weakening programming for the tested steel wire rope with the JZ-series magnetic loading probe, and then online acquires state information of spatial magnetic-field distribution of the tested steel wire rope in real time with JC-series detection probe, and transmits an effective signal acquired to the data acquisition and conversion workstation.

Figure 4:
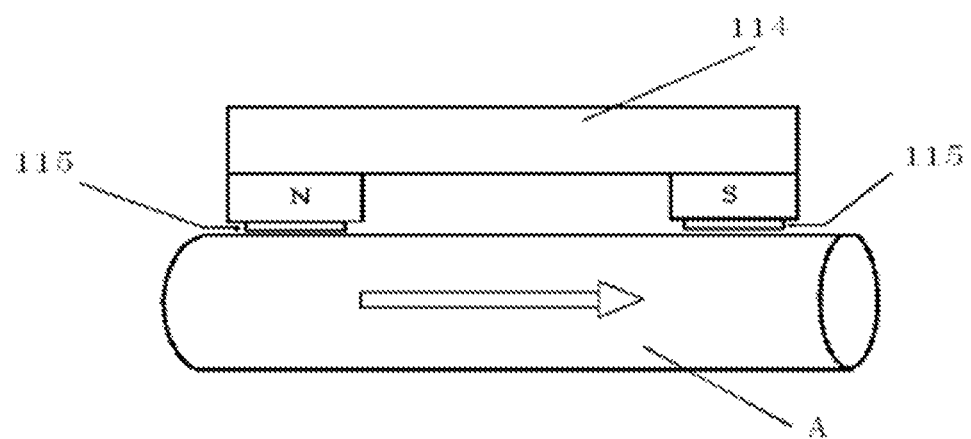
FIG. 4 is a schematic structural diagram of a Hall element detection device in the comprehensive information detection system for a steel wire rope provided in an embodiment of the present disclosure.

Referring to FIG. 4, the Hall element detection device is consisted of a Hall element probe (not illustrated), a permanent magnetic body 114, a Hall element 115, a steel wire rope A and other structures, wherein a direction of arrow in this figure is a magnetization direction.

Figure 5:
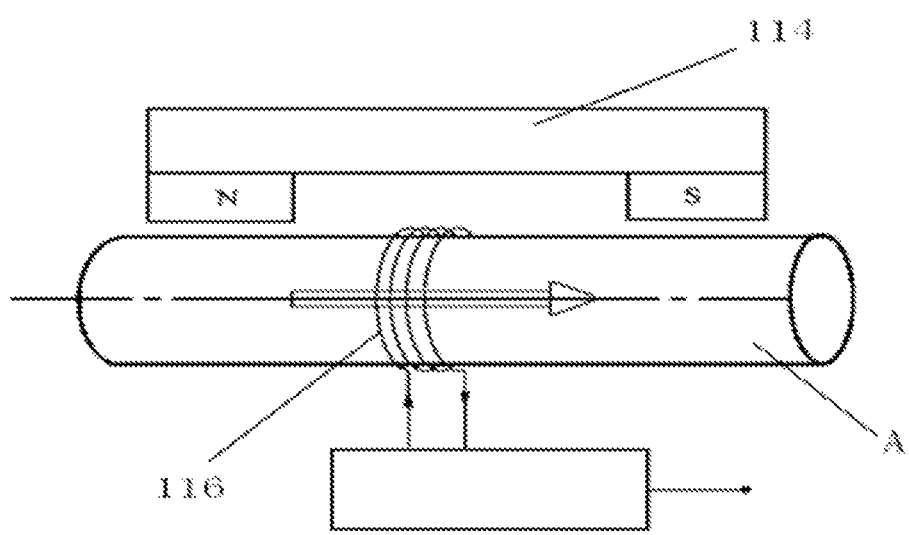
FIG. 5 is a schematic structural diagram of an induction coil detection device in the comprehensive information detection system for a steel wire rope provided in an embodiment of the present disclosure.

Referring to FIG. 5, the induction coil detection device is consisted of an induction coil probe (not illustrated), a permanent magnetic body 114, an induction coil 116, a steel wire rope A and other structures, wherein a direction of arrow in this figure is a magnetization direction.

Figure 6:
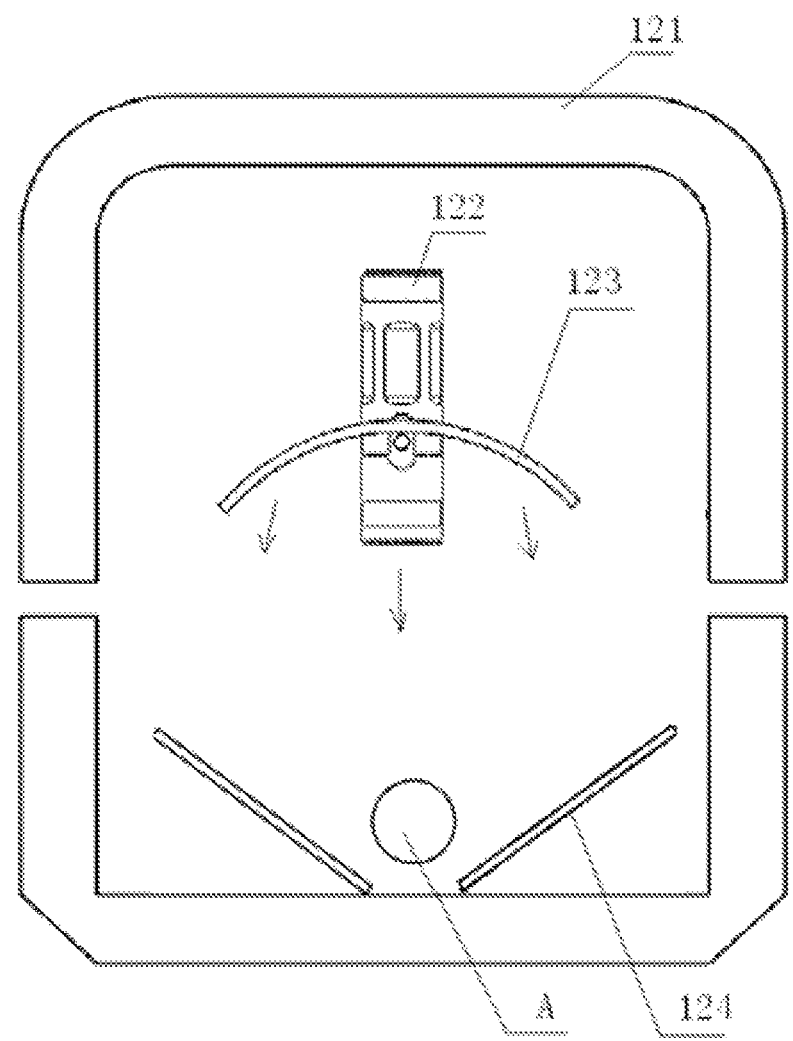
FIG. 6 is a schematic structural diagram of a machine vision damage recognition device for a steel wire rope in the comprehensive information detection system for a steel wire rope provided in an embodiment of the present disclosure.
Figure 7:
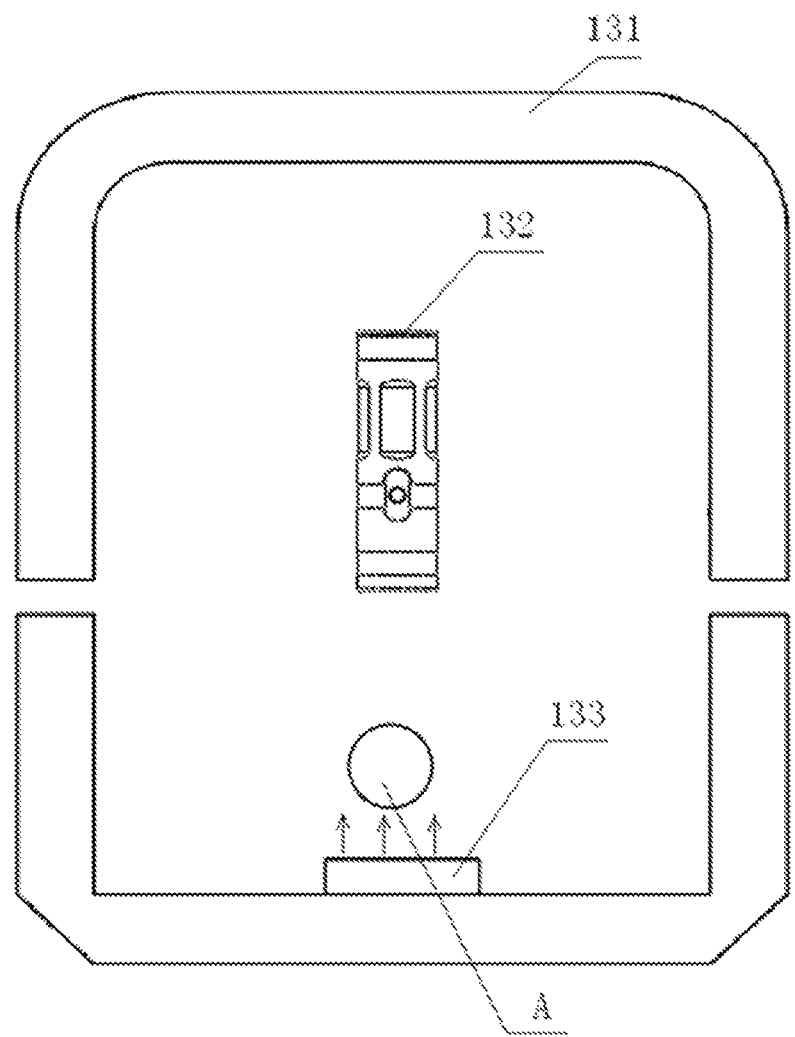
FIG. 7 is a schematic structural diagram of a machine vision diameter measurement device for a steel wire rope in the comprehensive information detection system for a steel wire rope provided in an embodiment of the present disclosure.

Referring to FIG. 6, the machine vision damage recognition device 12 for a steel wire rope is mainly consisted of the case 121, the image acquisition device 122 (i.e. a video equipment or photographing equipment) provided inside the case 121, the illumination light source generation device 123 and other structures. In the above FIG. 6 and FIG. 7, directions of arrows simply represent and illustrate illumination directions of illumination light beams. As illustrated in FIG. 6, wherein, illumination light beams emitted by the illumination light source generation device 123 are scattered. As illustrated in FIG. 7, illumination light beams emitted by the parallel light source generation device 133 are parallel;

Referring to FIG. 7, the machine vision diameter measurement device 13 for a steel wire rope is mainly consisted of a case 131, and a shadow image acquisition device 132 and a parallel light source generation device 133 provided inside the case 131, and other structures.

Figure 8:
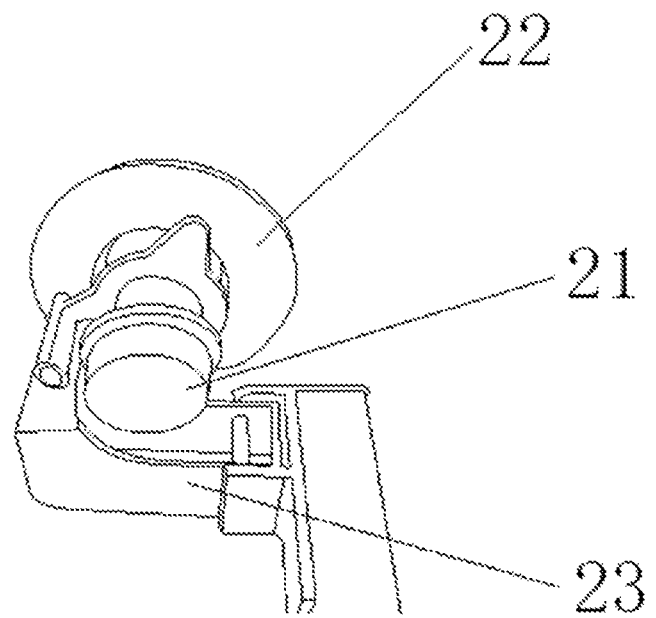
FIG. 8 is a schematic structural diagram of a stroke metering device in the comprehensive information detection system for a steel wire rope provided in an embodiment of the present disclosure.

Referring to FIG. 8, the stroke metering device 2 (as illustrated in FIG. 8) is consisted of a photoelectric encoder 21, a friction roller 22, a connecting means 23 and other fixed support bodies, the stroke metering device usually should be mounted at an edge of a friction roller of the tested steel wire rope or a shaft end of a drive rotation shaft (shaft coupling type).

It should be indicated that the stroke metering device provides a sample pulse to the data acquisition and conversion workstation, so as to cooperate with the detection device and the data acquisition and conversion workstation to extract a flux-weakening detection signal of the steel wire rope according to a specified stroke interval.

Figure 9:
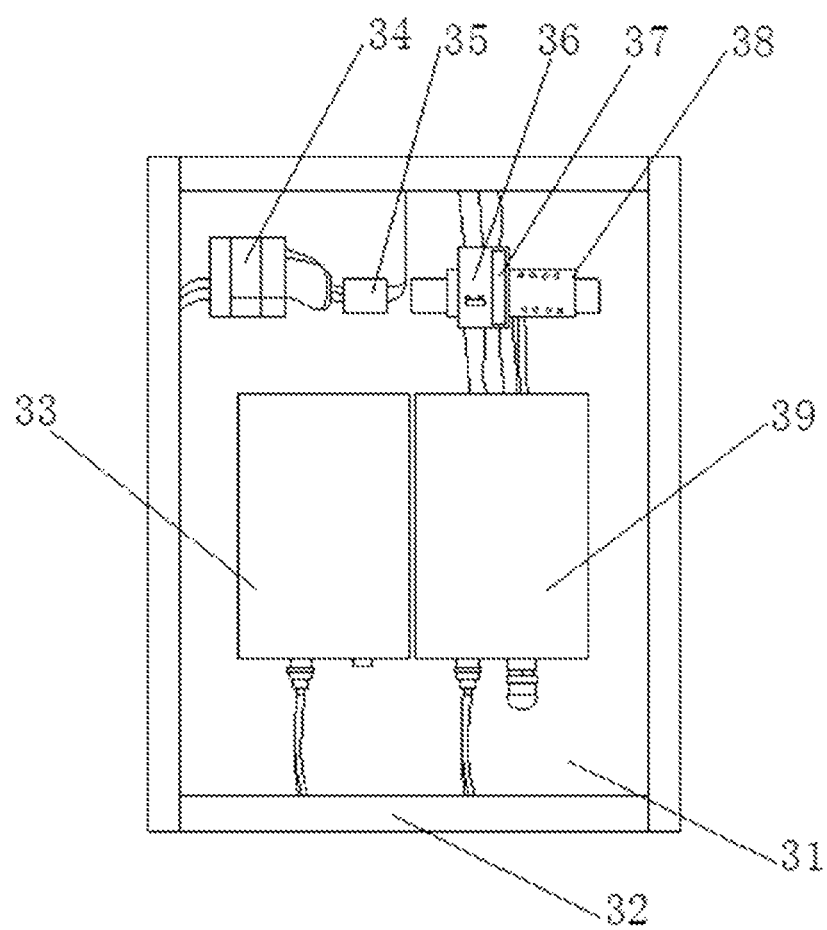
FIG. 9 is a schematic structural diagram of a data acquisition and conversion workstation in the comprehensive information detection system for a steel wire rope provided in an embodiment of the present disclosure.

Referring to FIG. 9, the data acquisition and conversion workstation 3 (FIG. 9): realizes high-accuracy analog-digital conversion using an ARM-series processor and a 12-bit accuracy A/D sampling chip. Specific hardware construction of the data acquisition and conversion workstation include a mount base plate 31, a trunking 32, a stroke and alarm controller 33, an isolation transformer 34, a power supply filter 35, a power supply air switch 36, a fuse 37, a connecting terminal board 38, a data conversion processor 39, and other structures, and they will not be repeated one by one in the embodiments of the present disclosure.

It should be indicated that the data acquisition and conversion workstation achieves high-accuracy analog-to-digital conversion using the ARM-series processor and the 12-bit accuracy A/D sampling chip. After sampling original detection information from the detection unit, the data acquisition and conversion workstation fulfill specified digital-analog convention and information format conversion, realizes primary processing and information storage for original data, and transmits in real time, in a manner of wired (wireless) communication transmission, a damage signal of the steel wire rope in operation back to the terminal control master station to be analyzed.

Figure 10:
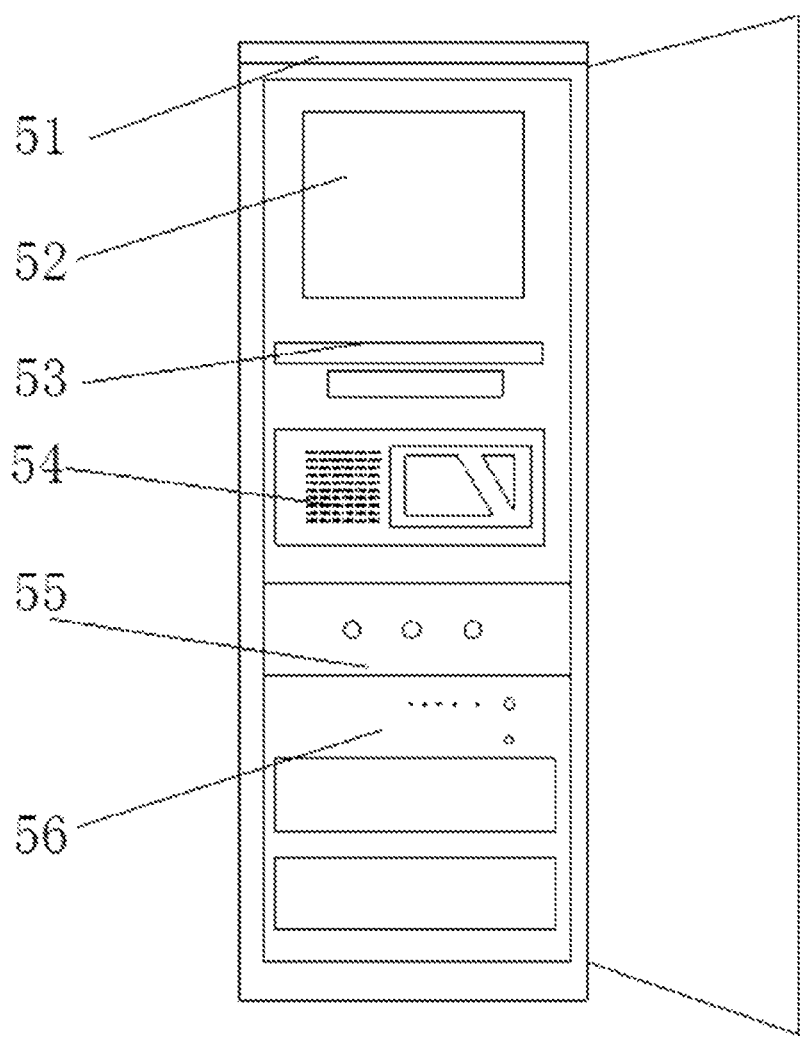
FIG. 10 is a schematic structural diagram of a terminal control master station in the comprehensive information detection system for a steel wire rope provided in an embodiment of the present disclosure.

Referring to FIG. 10, the terminal control master station 5 and the alarm controller 4 (FIG. 10): the terminal control master station 5 acts as a control center of the detection system, and the terminal control master station is realized using a computer of a corresponding industrial grade according to user's practical requirements and configurations. The stage of the damage state of the steel wire rope is prompted online in real in an audible-vision manner while the detection is being implemented. The above terminal control master station 5 is mainly consisted of a cabinet 51, a liquid crystal display 52, a keyboard/(mouse 53), an industrial computer 54, an voice and light alarm device 55, an association signal acquisition circuit box 56 and other hardware structures, and they are not repeated one by one in the embodiments of the present disclosure.

It should be indicated that that the alarm controller is an STC-series single chip microcomputer, and realizes audible-vision display of a fault of a probe, a power supply state, a grade of defect of the steel wire rope according to an analysis processing instruction of tested data of the steel wire rope by the terminal control master station, thus providing an online real-time alarm function that can be selected by the user. The terminal control master station, which is a center of the whole detection system, can perform comprehensive synthesis analysis for the received detection information, thus providing the user an analysis and processing result each day and tendency of damage change of the steel wire rope, and realizing online real-time detection.

In the comprehensive information detection system for a steel wire rope provided in the present disclosure, a comprehensive technical solution is obtained by replacing manual operation with machine. The present system is capable of correctly detection all of various damages of the steel wire ropes listed in the standard. In the comprehensive information detection system for a steel wire rope provided in the present disclosure, 20 damage samples specified in the standard [i.e. National Standard of the People's Republic of China: Cranes-Wire ropes-Care, maintenance, installation, examination and discard (GB/T 5972)(ISO 4309)] must be taken as samples for verifying the detection capability of the present disclosure. The comprehensive information detection system for a steel wire rope provided in the present disclosure can accurately and effectively detect any type of steel wire rope such as round-strand steel wire ropes, shaped-strand steel wire ropes, surface-contact steel wire ropes, flat steel wire ropes for balance, and so on. The capability of the comprehensive information detection system for a steel wire rope provided in the present disclosure for detection the damages of the steel wire ropes can be better than those required by standards for detection the steel wire ropes issued by US, EU, Japan, and China. The technical problem in detection the steel wire ropes is solved relatively comprehensively. The comprehensive information detection system for a steel wire rope provided in the present disclosure greatly improves and guarantees the technologies of acceptance detection of the steel wire rope, pre-service inspection of the steel wire rope, and periodical detection of the steel wire rope, and perfects the detection method, determination method, and so on.

As to the design idea of the comprehensive information detection system for a steel wire rope provided in the present disclosure:

Researches reveal that the conventional manual recognition has reasonable factors, because the manual vision recognition itself is relatively vision, and can refine and recognize the specific damage situation, therefore, the function of manual vision recognition is maintained in the present disclosure, however, a brand-new technology is used in the comprehensive information detection system for a steel wire rope provided in the present disclosure; it specifically outputs the image through the image acquisition device for the operator's manual vision recognition; meanwhile, the damage database is matched through the image processing technologies, to realize the machine vision recognition at the same time;

besides, the conventional measurement also has reasonable factors, because through the conventional manual diameter measurement, the damage situation can be better quantitatively recognized, especially for the necking of the steel wire rope and other damages, and the damage situation can be better refined; therefore, the function of diameter measurement recognition is maintained in the present disclosure, however, a brand-new diameter measurement technology is adopted in the comprehensive information detection system for a steel wire rope provided in the present disclosure; that is, automatically measuring the numerical value of the diameter of the steel wire rope at the target location through the machine vision technology, further determining the refined situation of the damage of the diameter of the steel wire rope at the target location.

Apparently, in the conventional technologies, the specific refined situation of the damage cannot be determined purely through the nondestructive inspection, and the specific type of the damage can only be roughly determined if solely using the nondestructive inspection, but the specific situation of the damage cannot be determined, let alone refining or quantizing the damage, or judging whether to discard the steel wire rope. However, the comprehensive information detection system for a steel wire rope provided in the present disclosure not only can qualitatively detect the damage, but also can further qualitatively determine the damage situation through specific combination with the vision recognition and the diameter measurement manners, and more importantly, quantitatively measure and recognize the specific quantitative situation of the damage of the steel wire rope, and determine whether to discard the steel wire rope, thus, the damage of the steel wire rope can be tested more fully, more accurately, and more efficiently in three aspects, i.e. electromagnetic nondestructive inspection, vision recognition, and diameter measurement, which has a higher detection efficiency, is more quick, and has a higher detection rate and a to higher detection quality (which are the most important), thus greatly ensuring the quality of detection the steel wire ropes.

The comprehensive information detection system for a steel wire rope provided in the present disclosure at least has technical advantages in the following aspects:

I. The comprehensive information detection system for a steel wire rope provided in the present disclosure can effectively detect the steel wire ropes that can transmit a load for a long distance (i.e. having a large coefficient of bearing safety, and being safe and reliable to use). The comprehensive information detection system for a steel wire rope provided in the present disclosure has relatively more structures, but the core devices are light in dead weight, and thus the comprehensive information detection system is easy to carry and transport.

II. The comprehensive information detection system for a steel wire rope provided in the present disclosure performs continuous detection for the steel wire ropes in a condition of high-velocity operation using high-velocity video equipment (i.e. high-velocity image acquisition device and high-velocity shadow image acquisition device), and it is good in operation stability, therefore, it has a higher detection efficiency, and a quicker detection velocity. Compared with the conventional manual vision detection (whose velocity is less than 0.5 m/s) and the conventional manual detection with a caliper (which only can detect in a static state of the steel wire rope), the comprehensive information detection system for a steel wire rope provided in the present disclosure can reach a detection speed of no less than 5 m/s, thus has incomparable technical advantages.

III. In the comprehensive information detection system for a steel wire rope provided in the present disclosure, the detection device has the steel wire rope electromagnetic detection device, which can implement qualitative and quantitative judgment for the detection of the damage of the steel wire ropes;

IV. in the comprehensive information detection system for a steel wire rope provided in the present disclosure, the machine vision damage recognition device for a steel wire rope therein can further perform vision quantitative recognition for the damage situation of the steel wire rope and judgment of the specific damage situation;

V. in the comprehensive information detection system for a steel wire rope provided in the present disclosure, the machine vision diameter measurement device for a steel wire rope therein can further perform quantitative recognition of diameter to data of the damage situation of the steel wire rope and judgment of specific damage situation;

VI. in the comprehensive information detection system for a steel wire rope provided in the present disclosure, the detection device therein has four device structures, i.e. the steel wire rope electromagnetic detection device, the machine vision damage recognition device for a steel wire rope, the machine vision diameter measurement device for a steel wire rope, and the damage location marking device, integrates four functions, i.e. electromagnetic nondestructive inspection detection, detection by machine vision damage recognition, detection by machine vision diameter change recognition, and location marking, can comprehensively determine and evaluate the damage situation of the steel wire rope and refine the damage data information, further comprehensively improving the refinement degree of the detection and the detection accuracy, moreover, the detection rate of damage is extremely high, ensuring the quality of detection the steel wire rope, and avoiding technical problems such as erroneous detection and omission. The comprehensive information detection system for a steel wire rope provided in the present disclosure overcomes the technical defects of solely using the means of nondestructive inspection detection, and uses for reference the reasonable factors of the manual vision recognition and the manual diameter measurement with a caliper. Since it realizes the vision recognition and the diameter measurement recognition with the technical means of machine vision recognition, it not only absorbs the reasonable factors of the manual vision recognition and the manual diameter measurement with a caliper, but also overcomes the defects such as fatigability, low detection rate, more limitations caused by the conventional technology relying on the manual detection means.

VII. The comprehensive information detection system for a steel wire rope provided in the present disclosure has the technical advantages of light workload, intuitivity, preciseness, convenience in manual re-detection, automatic issuance of the detection report and so on, and has the merit of convenient popularization and application, thus being suitable for various enterprises of manufacturing and using the steel wire ropes.

VIII. The comprehensive information detection system for a steel wire rope provided in the present disclosure provides safer and more reliable technical supports for detection the steel wire ropes, and also has a broader application range.

To sum up, the comprehensive information detection system for a steel wire rope provided in the embodiments of the present disclosure has the technical advantages in many aspects, therefore, it will surely bring about good market prospect and economic benefit.

Finally, it is to be explained that the various embodiments above are merely used to illustrate the technical solutions of the present disclosure, rather than limiting the disclosure. Although the detailed description is made to the present disclosure with reference to the above-mentioned embodiments, those ordinarily skilled in the art should understand that the technical solutions recited in the above-mentioned embodiments can be modified, or equivalent substitutions can be made to some or all of the technical features therein, and these modifications or substitutions do not make the corresponding technical solutions essentially depart from the spirit and scope of the technical solutions of the embodiments of the present disclosure.

The invention claimed is:

1. A comprehensive information detection system for a steel wire rope, comprising:
a detection device;
a stroke metering device;
a data acquisition and conversion workstation;
an alarm controller; and
a terminal control master station,
wherein,
the data acquisition and conversion workstation being connected by a communication interface as well as coupled by conductive wire, to the terminal control master station, the detection device, the stroke metering device, and the alarm controller respectively;
the detection device comprising a steel wire rope electromagnetic detection device, a machine vision damage recognition device for a steel wire rope, a machine vision diameter measurement device for a steel wire rope, and a damage location marking device;
wherein
the steel wire rope electromagnetic detection device comprises an electromagnetic sensor detection device, a Hall element detection device, and an induction coil detection device;
the steel wire rope electromagnetic detection device is configured to perform real-time detection for a steel wire rope in linear motion in a manner of nondestructive inspection; and if a damage is detected at a location on the steel wire rope based on a result of the real-time detection, determine the location with the damage as a target location; and the steel wire rope electromagnetic detection device is further configured to send, upon detection of the target location on the steel wire rope where the damage exists, a starting signal to activate the machine vision damage recognition device for a steel wire rope, the machine vision diameter measurement device for a steel wire rope, and the damage location marking device to perform respective operations on the steel wire rope at the target location;
the machine vision damage recognition device for a steel wire rope comprises a case, an image acquisition device and an illumination light source generation device that are provided inside the case; the illumination light source generation device is configured to activate, upon reception of the starting signal, the illumination light source generation device, so as to provide an illumination light source to an enclosed space inside the case; the image acquisition device is configured to perform, upon reception of the starting signal, image acquisition for the steel wire rope at the target location, then output an image by display equipment for user's recognition and judgment about whether an external defect exists on the steel wire rope at the target location;
the machine vision diameter measurement device for a steel wire rope comprises a case, and a shadow image acquisition device and a parallel light source generation device that are provided inside the case; the parallel light source generation device is an illumination device capable of generating parallel light beams; the parallel light source generation device is configured to be activated upon reception of the starting signal, and emit parallel light beams to the steel wire rope at the target location; the shadow image acquisition device is configured to, upon reception of the starting signal, acquire a shadow image of the steel wire rope at the target location formed under irradiation of the parallel light beams, and calculate value of a diameter of the steel wire rope at the target location by acquiring a range of diameter of the shadow image, so as to determine whether the diameter of the steel wire rope at the target location changes; and
the damage location marking device is configured to be activated upon reception of the starting signal, to perform an action of spraying a mark, to the steel wire rope at the target location.

2. The comprehensive information detection system for a steel wire rope of claim 1,
wherein
the steel wire rope electromagnetic detection device is configured to detect in real time the steel wire rope at a current location, and obtain a detection waveform of the steel wire rope at the current location, determine if the detection waveform of the steel wire rope at the current location reaches a waveform height threshold, and if so, recognize the current location as the target location with the damage;
the steel wire rope electromagnetic detection device is further configured to detect the steel wire rope at the target location, and obtain a nondestructive inspection detection report; the steel wire rope electromagnetic detection device is further configured to display and output the nondestructive inspection detection report through display equipment;
the nondestructive inspection detection report comprises a primary report and a secondary report;
the primary report comprises a total detection length, an overall damage quantity and a steel wire rope joint name, and length, location, magnitude, necking and type of important damages of the steel wire rope; and
the secondary report comprises a sequence list of damage and the detection waveform.

3. The comprehensive information detection system for a steel wire rope of claim 2,
wherein
the machine vision damage recognition device for a steel wire rope further comprises an image recognition and processing device; and
the image recognition and processing device is configured to, upon reception of the starting signal, perform image acquisition for the steel wire rope at the target location, to obtain an image of the target location, and determine, upon image matching and image differentiation between an image acquisition sample of the steel wire rope at the target location and a damage sample database, whether the steel wire rope at the target location has a damage on a surface of the steel wire rope, and further determine a specific type and quantity of the damage of the steel wire rope at the target location.

4. The comprehensive information detection system for a steel wire rope of claim 3, wherein the machine vision damage recognition device for a steel wire rope further comprises the damage sample database; the damage sample database stores multiple damage samples.

5. The comprehensive information detection system for a steel wire rope of claim 4, wherein the image acquisition device is video equipment or photographing equipment.

6. The comprehensive information detection system for a steel wire rope of claim 5, wherein the shadow image acquisition device is video equipment or photographing equipment.

7. The comprehensive information detection system for a steel wire rope of claim 6, wherein the parallel light source generation device is an LED illumination device.

8. The comprehensive information detection system for a steel wire rope of claim 7, wherein the damage location marking device is automatic paint spraying equipment, and the automatic paint spraying equipment is electrically coupled to the detection device.

9. The comprehensive information detection system for a steel wire rope of claim 1, further comprising an voice and light alarm device, the alarm controller being configured to receive the starting signal, and simultaneously activate the voice and light alarm device to perform a flash alarm operation and a ringing alarm operation.

10. The comprehensive information detection system for a steel wire rope of claim 1, further comprising a stroke metering device, the stroke metering device being configured to detect a length of the wire rope at the target location.

* * * * *